US007185281B2

(12) United States Patent
Farago et al.

(10) Patent No.: US 7,185,281 B2
(45) Date of Patent: Feb. 27, 2007

(54) REMOTE METERING DISPLAY WITH MOTION SENSOR

(75) Inventors: Jeff J. Farago, Franklin, TN (US); Don T. McComas, Nolensville, TN (US); Ken L. McMahon, Franklin, TN (US); Michael W. Pyle, Hermitage, TN (US); M. Jason Thurmond, Murfreesboro, TN (US); Eric M. Lutz, San Diego, CA (US)

(73) Assignee: Square D Company, Palatine, IL (US)

( * ) Notice: Subject to any disclaimer, the term of this patent is extended or adjusted under 35 U.S.C. 154(b) by 539 days.

(21) Appl. No.: 09/765,860

(22) Filed: Jan. 18, 2001

(65) Prior Publication Data
US 2002/0126157 A1 Sep. 12, 2002

(51) Int. Cl.
G06F 3/00 (2006.01)
G06F 15/00 (2006.01)

(52) U.S. Cl. ........................ 715/700; 715/867; 702/188

(58) Field of Classification Search ................ 715/700, 715/867, 810, 835, 854; 702/188
See application file for complete search history.

(56) References Cited

U.S. PATENT DOCUMENTS

| 5,339,104 | A | * | 8/1994 | Hong | 348/155 |
|---|---|---|---|---|---|
| 5,465,366 | A | * | 11/1995 | Heineman | 713/324 |
| 5,929,445 | A | * | 7/1999 | Barone | 250/353 |
| 6,034,602 | A | * | 3/2000 | Quibodeaux | 340/567 |
| 6,038,516 | A | * | 3/2000 | Alexander et al. | 702/67 |
| 6,076,169 | A | * | 6/2000 | Lee | 713/320 |
| 6,088,659 | A | * | 7/2000 | Kelley et al. | 702/62 |
| 6,122,603 | A | | 9/2000 | Budike, Jr. | 702/182 |
| 6,215,399 | B1 | * | 4/2001 | Shpater | 340/567 |
| 6,362,541 | B1 | * | 3/2002 | Kawata | 307/125 |
| 6,367,020 | B1 | * | 4/2002 | Klein | 713/202 |
| 6,374,145 | B1 | * | 4/2002 | Lignoul | 700/17 |
| 6,401,209 | B1 | * | 6/2002 | Klein | 713/200 |
| 6,504,534 | B1 | * | 1/2003 | Takase et al. | 345/211 |
| 6,523,122 | B1 | * | 2/2003 | Moon | 713/300 |
| 6,560,711 | B1 | * | 5/2003 | Given et al. | 713/200 |
| 6,804,792 | B2 | * | 10/2004 | Nishikawa | 713/323 |

FOREIGN PATENT DOCUMENTS

| DE | 197 18 911 A1 | 11/1998 |
|---|---|---|
| FR | 2 694 815 A1 | 9/1954 |
| WO | WO 99 02998 A | 1/1999 |

OTHER PUBLICATIONS

Bequdouin-Lafon (Instrumental interaction: an interaction model for designing post-WIMP User Interfaces, pp. 446-453, SIGCHI: ACM Special Interest Group on Computer-Human Interaction, Apr. 2000).*

(Continued)

Primary Examiner—Sy D. Luu

(57) ABSTRACT

A remote metering display is used for displaying power-related information generated by a power meter linked to the display. The remote metering display comprises a display screen, a plurality of user interface buttons for navigating through menu options depicted on the display screen, and a motion sensor for activating the display screen in response to detection of a person's presence within a predetermined distance of the motion sensor.

18 Claims, 3 Drawing Sheets

OTHER PUBLICATIONS

"Powerlogic® Advanced Power Reliability Solutions," Square D Schneider Electric, brochure, 2000, 3 pages.

"Powerlogic® Circuit Monitor—Series 2000," Class 3020, Square D Schneider Electric, brochure, 3 pages.

"Powerlogic® Power Meter," Class 3020, Square D Schneider Electric, brochure, 1998, 2 pages.

"Powerlogic® Metering & Monitoring Devices," Square D Schneider Electric, brochure, 2000, 2 pages.

"Powerlogic® Power Monitoring and Control System," Square D Schneider Electric, brochure, 1998, 4 pages.

"Powerlogic® Series 4000 Circuit Monitor," Square D Schneifer Electric, brochure, 2000, 3 pages.

"Powerlogic® System Architecture and Application Guide," Data Bulletin, Square D Schneider Electric, May 2000.

"Active Infrared Presence Sensor" IBM Technical Disclosure Bulletin, IBM Corp. New York, US, vol. 38 No. 12, Dec. 1, 1995, pp. 419-421, XP000588190.

International Search Report for International Application No. PCT/US2002/01463, dated Oct. 21, 2002 (3 pages).

\* cited by examiner

REMOTE METERING DISPLAY WITH MOTION SENSOR

FIELD OF THE INVENTION

The present invention relates generally to power monitoring systems and, more particularly, to a remote metering display with motion sensor for use in a power monitoring system.

BACKGROUND OF THE INVENTION

Power monitoring systems monitor the flow of electrical power in circuits through a plant or other facility. In the POWERLOGIC system manufactured by the instant assignee, circuit monitors and power meters are dedicated to power monitoring, while other compatible devices collect additional equipment information from protective relays, circuit breakers, transformer temperature controllers, and panelboards. Electrical data, such as current, power, energy, waveforms, and equipment status, is passed over a data network to one or more personal computers. The personal computers run power monitoring application software that retrieves, stores, organizes, and displays real-time circuit information in simple, usable formats. The information collected and stored in a power monitoring system helps operate a facility more efficiently. The quality of the data depends upon the accuracy of the instrumentation and the usability of the display formats.

The power meter can replace conventional metering devices such as ammeters, voltmeters, and watt-hour meters while providing other capabilities not offered by analog metering. The power meter's true rms readings reflect non-linear circuit loading more than conventional analog metering devices. The power meter calculates the neutral current, which can assist in identifying overloaded neutrals due to either unbalanced single phase loads or triplen harmonics. Circuits can be closely monitored for available capacity by keeping track of the peak average demand current.

The power meter can provide a full complement of rms metering values to a metering display and/or via a standard communication port to a power monitoring and control system. The display is connected to the power meter with a communications cable and allows the user to view metering data and access meter setup and reset menus. Because the display can be mounted at a remote location relative to the power meter itself, the power meter can be installed in tight equipment spaces without sacrificing a convenient and affordable metering display.

One type of remote metering display includes a character-based display screen that presents power monitoring data such as voltage, current, power and energy. The display is remote from the power meter but is connected to the power meter via an RS-232 or other communications cable that provides both the power metering data and power to the display. By using several user interface buttons, a user can selectively navigate through defined data screens that present specific data. The remote metering display may be mounted on a front switchgear panel while the power meter itself is mounted within the switchgear. In fact, there may be several displays mounted on the same front switchgear panel.

SUMMARY OF THE INVENTION

On the one hand, to allow the power monitoring data to be highly visible to a user, it is desirable for the data to be presented in such a way that it can be viewed from several feet away from the display. Also, it is desirable to have the display continuously present power metering data so that a user can immediately approach the display and record the data.

On the other hand, it is desirable for the remote metering display to automatically power down or "go to sleep" when there is no activity on the buttons for a predetermined period of time. The display powers down for the following reasons: (a) reduce the power consumption of the remote metering display from the power meter; (b) lengthen the total life span of the display screen which can degrade while in continuous operation; and (c) prevent "burn in" of the display screen while in continuous operation over several hours.

To satisfy these objectives, the present invention provides a remote metering display having a display screen controlled by a motion sensor. The motion sensor is used to prolong the life span of the display screen by reducing its total hours of operation or "power on" time. Specifically, in response to detecting a person's presence within a predetermined distance of the display, the motion sensor automatically sends an activation signal to the display screen. This, in turn, allows the person to view or "power on" the display screen without physically interacting with it (e.g., pressing a function key). After a predefined period of idle time (e.g., 10 minutes) when no motion is detected by the motion sensor and no keys have been depressed, the display places the display screen in a "power off" mode. Thus, the total hours of operation of the display screen are reduced.

BRIEF DESCRIPTION OF THE DRAWINGS

The foregoing and other advantages of the invention will become apparent upon reading the following detailed description and upon reference to the drawings in which.

Figure 1:
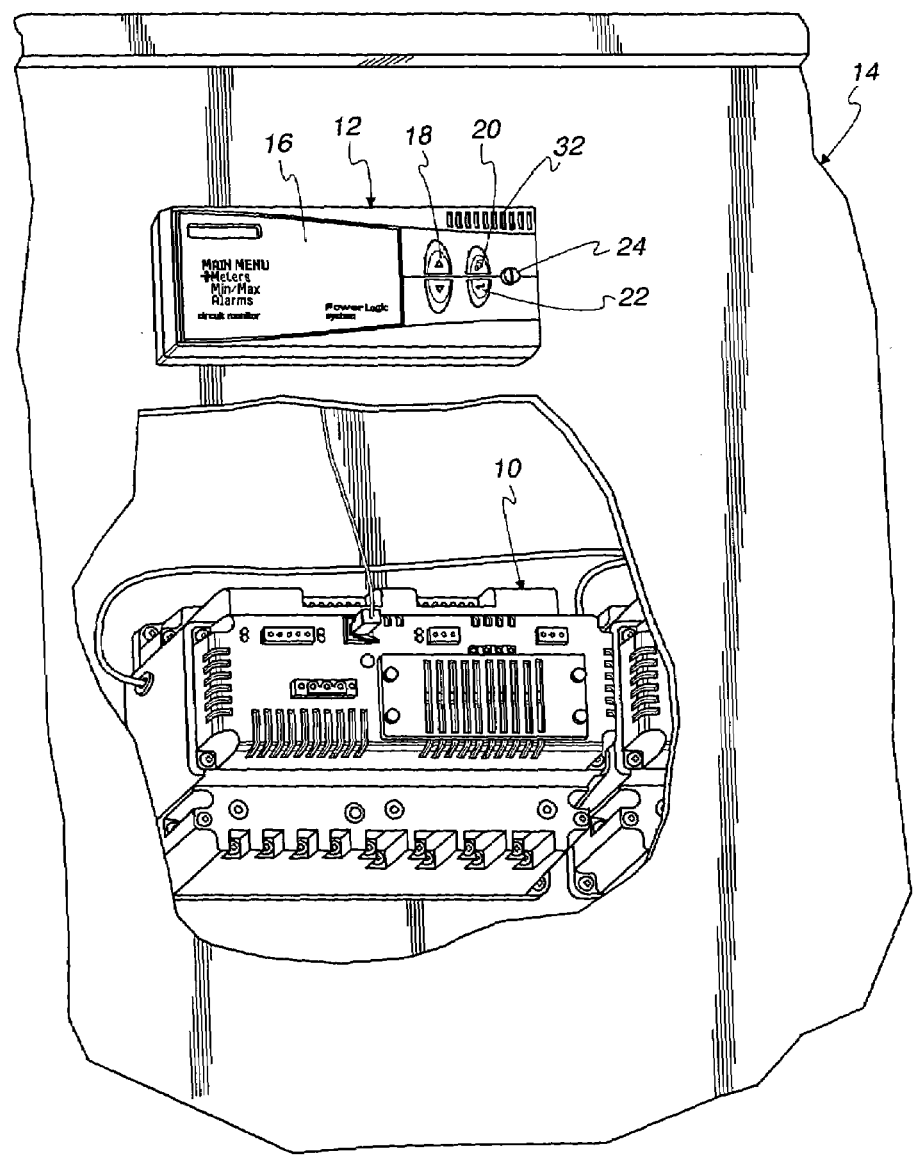
FIG. 1 is a perspective view of a power metering arrangement having a remote metering display and having portions of a switchgear panel broken away to reveal internal structure.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, there is depicted a power metering arrangement embodying the present invention. The power metering arrangement includes a power meter 10, a remote metering display 12, and a switchgear 14. The power meter 10 is mounted within the switchgear 14 while the remote metering display 12 is mounted either to a front panel of the switchgear 14 or elsewhere. The remote metering display 12 is linked to the power meter 10 by either a wired or wireless connection. If the remote metering display 12 derives its power from the power meter and is therefore not self-powered, then the connection between the display 12 and the power meter 10 is wired.

The power meter 10 is preferably located in a distributed power network carrying a power-related waveform. An example of such a power meter 10 is disclosed in U.S. Pat. No. 5,831,428 to Pyle et al., which is incorporated herein by reference in its entirety. Briefly, the power meter 10 is disposed adjacent to an associated one of the branches in the network for sensing power-related signals in that branch and for generating and transmitting data based on the power-related signals to the remote metering display 12 and possibly a central control station. The power meter 10 is coupled to the lines of the network branch by current and potential transformers and collects analog samples of the power-related signals sensed by these transformers. The analog samples are conditioned, digitized, and evaluated by power-related calculations that determine such power parameters as the average demands of current in each of the three phases and of real power, the predicted demand of real power, the peak demand of current in each of the three phases and of real power, the accumulated real and reactive energy, rms calculations of voltage and current, and power quality calculations such as total harmonic distortion.

The remote metering display 12 includes a flat panel display screen 16 such as a vacuum florescent display (VFD), liquid crystal display (LCD), plasma display, field emission display, digital micromirror display (DMD), dot matrix display, or other display type. The display screen 16 preferably shows four lines of information at a time. The remote metering display 12 also includes buttons that allow a user to scroll through and select information, move from menu to menu, and adjust the contrast. Specifically, the arrow buttons 18 are used to scroll up and down the option on a menu. Also, when a value can be changed, the arrow buttons are used to scroll through the values that are available. If the value is a number, holding the arrow button down increases the speed in which the numbers increase or decrease. Each time the user presses a menu button 20, the display 12 takes the user back one menu level. The menu button 20 also prompts the user to save if the user made changes to any options within that menu structure. The enter button 22 is used to select an option on a menu or select a value to be edited. The contrast button 24 is pressed to darken or lighten the display screen 16.

Figure 2:
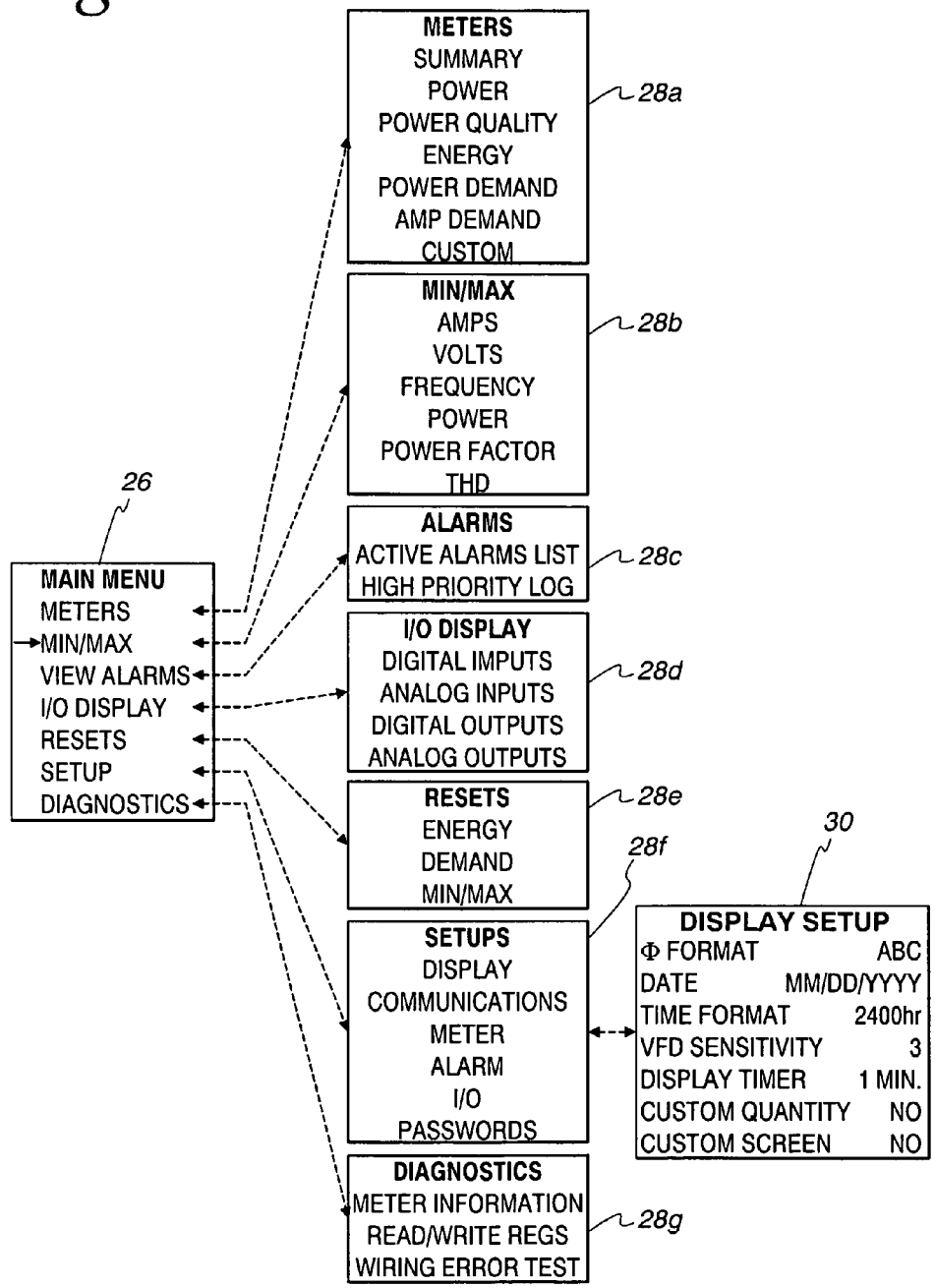
FIG. 2 is a diagrammatic view of a multi-level menu structure employed by the remote metering display.

FIG. 2 illustrates a multi-level menu structure employed by the remote metering display 12. The menu structure includes a Main Menu 26 and a plurality of first-level sub-menus 28a, 28b, 28c, 28d, 28e, 28f, and 28g accessed via the Main Menu 26. The menus contain menu options that the user can use to set up and control the power meter and its accessories and view metered data and alarms. The Main Menu 26 contains seven menu options: Meters, Min/Max, View Alarms, I/O Display, Resets, Setup, and Diagnostics. Selection of one of these options brings up a corresponding one of the sub-menus 28a–g. The Meters sub-menu 28a lets the user view metered values that provide information about power usage and power quality. The Min/Max sub-menu 28b lets the user view the minimum and maximum metered values since the last reset of the min/max values with their associated dates and times. The View Alarms sub-menu 28c lets the user view a list of all active alarms, regardless of priority. In addition, the user can view a log of high priority alarms, which contains ten of the most recent high priority alarms. From the I/O Display sub-menu 28d, the user can view the designation and status of each input or output. The Resets sub-menu 28e lets the user reset peak demand. From the Diagnostics sub-menu 28g, the user can initiate a wiring error test. Also, the user can use this sub-menu to read and write registers and view information about the power meter 10 such as its firmware version and serial number.

From the Setup sub-menu 28f, the user can creating custom quantities and custom screens is also an option on this sub-menu. In addition, the user can use this sub-menu to set up power meter parameters such as circuit transformer and potential transformer ratios. The Setup sub-menu 28f is also where the user can define communications, alarms, I/Os and passwords. Finally, as can be seen in FIG. 2, the user can access a second-level Display Setup sub-menu 30 to define the settings for the remote metering display 12. One of these definable settings is "Display Timer," which allows the user to select the number of minutes the display screen remains illuminated after inactivity. The available values for selection are 1, 5, 10, and 15 minutes, where the default value is 5 minutes. Another definable setting is "VFD Sensitivity," which allows the user to select the sensitivity value for a motion sensor 32 (see FIG. 1) mounted to the remote metering display 12. The available values for selection include:

| Available Values | Range |
|---|---|
| Off | — |
| 1 | 0–6 ft |
| 2 (default) | 0–12 ft |
| 3 | 0–20 ft |

In response to detecting a person's presence within a predetermined distance (range) associated with the setting under "VFD Sensitivity," the motion sensor 32 automatically illuminates the display screen 16. When no motion is detected by the motion sensor 32 and no buttons are pressed for the number of minutes associated with the setting under "Display Time," the display screen 16 is turned off.

Figure 3:
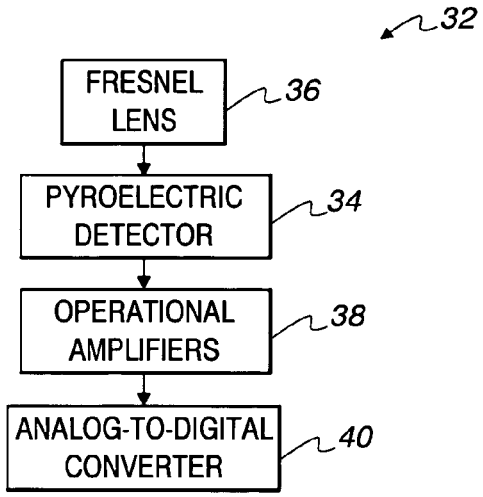
FIG. 3 is a block diagram of the components of the motion sensor.
Figure 4A:
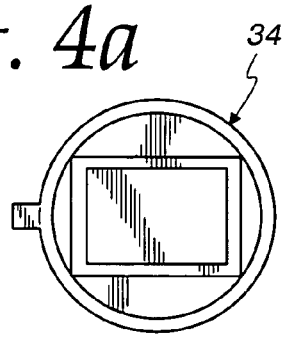
FIG. 4a is a front view of a pyroelectric detector that is a component of a motion sensor used to automatically activate the remote metering display.
Figure 4B:
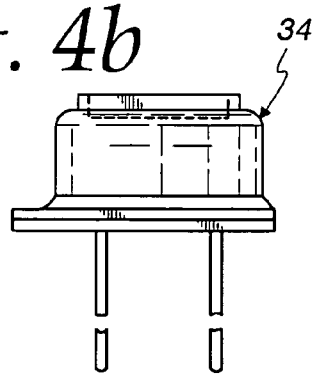
FIG. 4b is a first side view of the pyroelectric detector.
Figure 4C:
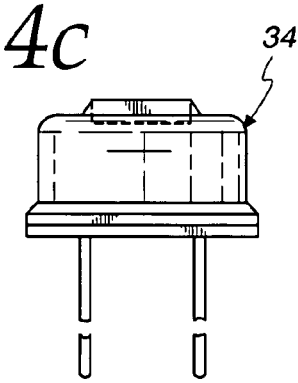
FIG. 4c is a second side view of the pyroelectric detector.
Figure 4D:
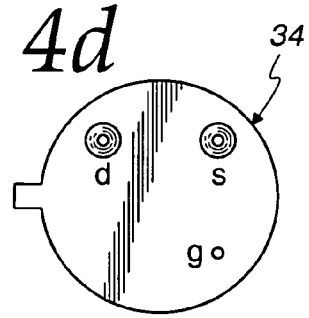
FIG. 4d is a bottom view of the pyroelectric detector.

Referring to FIG. 3, the motion sensor 32 includes four major components: a pyroelectric detector 34, fresnel lens 36, operational amplifiers 38, and an analog-to-digital converter 40. The pyroelectric detector 34 senses the presence of infrared waves projected from a human body (around 10 mm wavelength) and generates an analog signal based on the sensed infrared waves. FIGS. 4a, 4b, 4c, and 4d illustrate the pyroelectric detector 34. In a preferred embodiment, the pyroelectric detector 34 is implemented with a dual element pyroelectric detector, model no. P7178, commercially available from Hamamatsu Corporation of Bridgewater, N.J. Referring back to FIG. 3, this detector provides a suitable spectral response range (7 to 20 mm) with minimal noise characteristics and employs the fresnel lens 36 to focalize the infrared waves to the detector's active window area.

The fresnel lens 36 concentrates visible light or infrared waves from a wide horizontal and vertical zone to a defined focal point for image processing. For infrared signals, Fresnel Technologies of Fort Worth, Tex. provides a fresnel lens molded from POLY IR® infrared-transmitting plastic, which is suitable for this application due to its low absorption losses. In one embodiment, the fresnel lens 36 is implemented with item #0.1 Fresnel lens molded from POLY IR®-4 material commercially available from Fresnel Technologies. This lens is 12 mm×50 mm in size and is only 0.38 mm thick. The fresnel lens 36 provides the desired focalization of the specified infrared signal to detect a person within about 1 to 20 feet of the remote metering display 12, depending upon the selected sensitivity value for the motion sensor. The fresnel lens 36 is adhered into the display casing at a proper focal length to maximize the infrared signal passed to the pyroelectric detector 34.

An active optical filter and operational amplifiers 38 are used to filter and amplify an analog output signal transmitted from the pyroelectric detector 34. This amplified analog signal is then fed to a single analog-to-digital converter 40 located within the remote metering display's main processor. The digital signal generated by the analog-to-digital converter 40 is further processed and filtered by the processor, and human presence is determined when a transient in the analog signal is detected.

Sensitivity levels associated with the foregoing filtering procedure allow the remote metering display 12 to be configured for high traffic areas or turned off completely. If the display is in the "off" state, the only way to activate the display screen 16 is to press a function button on the display panel.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of remotely monitoring electrical power in an electrical circuit, comprising:
    coupling a power meter in a switchgear to an electrical circuit for sensing power-related signals in said electrical circuit and generating power-related information based on said power-related signals;
    connecting a metering display that is remote from said power meter to said power meter, said remote metering display including:
        a display screen for presenting, without user interaction, at least some of said power-related information when said display screen is powered on;
        a plurality of user interface buttons for navigating through menu options depicted on the display screen; and
        a motion sensor for powering on the display screen in response to detection of a person's presence within a predetermined distance of said remote metering display;
    accessing said power-related information by navigating through menu options on said display screen; and
    viewing from said distance at least some of said power-related information.

2. The method of claim 1, wherein said display screen is a vacuum florescent display screen.

3. The method of claim 1, including powering off said display screen in response to no motion being detected by the motion sensor and none of said user interface buttons being pressed for a predefined period of idle time.

4. The method of claim 3, wherein said predefined period of idle time is definable in one of said menu options using said user interface buttons.

5. The method of claim 1, wherein said motion sensor includes a plurality of selectable sensitivity levels for varying the predetermined distance, and further, selecting one of the sensitivity levels of said menu options using said user interface buttons.

6. The method of claim 1, wherein said motion sensor senses infrared waves projected from a person's body.

7. The method of claim 1, wherein said motion sensor includes a pyroelectric detector for sensing infrared waves projected from a person's body, and includes a fresnel lens for focalizing the infrared waves to a window area of said pyroelectric detector.

8. The method of claim 7, wherein said pyroelectric detector generates an analog output signal, and wherein said motion sensor further includes an analog-to-digital converter for receiving and digitizing the analog output signal.

9. A remote metering display for displaying power-related information generated by a separate power meter remotely linked to the metering display that is remote from the power meter and located in a switchgear, the remote metering display comprising:
    a processing unit;
    a display screen coupled to the processing unit for presenting, without user interaction, at least some of said power-related information from said remotely linked power meter when said display screen is powered on;
    a plurality of user interface buttons, coupled to the processing unit, for navigating through menu options depicted on the display screen; and
    a motion sensor, coupled to the processing unit, for powering on the display screen in response to detection of a person's presence within a predetermined distance of said remote metering display, said powering on allowing viewing from said distance at least some of said power-related information.

10. The display of claim 9, wherein the display screen is a vacuum florescent display screen.

11. The display of claim 9, wherein the display screen is powered off by the processing unit in response to no motion being detected by the motion sensor and none of the user interface buttons being pressed for a predefined period of idle time.

12. The display of claim 11, wherein the predefined period of idle time is definable in one of the menu options using the user interface buttons.

13. The display of claim 9, wherein the motion sensor includes a plurality of selectable sensitivity levels for varying the predetermined distance, one of the sensitivity levels being selected in one of the menu options using the user interface buttons.

14. A power metering arrangement, comprising:
    a power meter, coupled to a power line and located in a switchgear, for sensing power-related signals traveling through the power line and for generating power-related information based on the power-related signals; and
    a remote metering display for displaying the power-related information, the remote metering display being remotely linked to the power meter, the remote metering display including:
        a display screen for presenting, without user interaction, at least some of said power-related information when said display screen is powered on;
        a plurality of user interface buttons for navigating through menu options depicted on the display screen; and
        a motion sensor for powering on the display screen in response to detection of a person's presence within a predetermined distance of said remote metering display, said powering on allowing viewing from said distance at least some of said power-related information.

15. The display of claim 14, wherein the display screen is a vacuum florescent display screen.

16. The display of claim 14, wherein the display screen is powered off in response to no motion being detected by the motion sensor and none of the user interface buttons being pressed for a predefined period of idle time.

17. The display of claim 16, wherein the predefined period of idle time is definable in one of the menu options using the user interface buttons.

18. The display of claim 14, wherein the motion sensor includes a plurality of selectable sensitivity levels for varying the predetermined distance, one of the sensitivity levels being selected in one of the menu options using the user interface buttons.

* * * * *